United States Patent [19]

Micheli et al.

[11] Patent Number: 4,966,875
[45] Date of Patent: Oct. 30, 1990

[54] WEAR-RESISTANT CERAMIC FOR CASTING RARE EARTH ALLOYS

[75] Inventors: Adolph L. Micheli; Dennis F. Dungan, both of Mt. Clemens, Mich.

[73] Assignee: General Motors Corp., Detroit, Mich.

[21] Appl. No.: 100,428

[22] Filed: Sep. 24, 1987

[51] Int. Cl.⁵ .............................................. C04B 35/50
[52] U.S. Cl. .................................... 501/152; 501/126
[58] Field of Search ....................... 501/127, 152, 153

[56] References Cited

U.S. PATENT DOCUMENTS 4,098,612  7/1978  Rhodes et al. ...................... 501/127

FOREIGN PATENT DOCUMENTS 0500206  1/1976  U.S.S.R. .............................. 501/152

Primary Examiner—William R. Dixon, Jr.
Assistant Examiner—Anthony J. Green

[57] ABSTRACT

Refractory ceramics are provided which comprise at least about 70 mole percent yttrium oxide and from about 5 to 30 mole percent aluminum oxide. The ceramics are particularly resistant to attack by molten rare earth alloys and are superior refractories for use with molten neodymium-iron alloys in the manufacture of permanent magnets.

4 Claims, 1 Drawing Sheet

WEAR-RESISTANT CERAMIC FOR CASTING RARE EARTH ALLOYS

This invention relates to rare earth oxide-aluminum oxide refractory materials which are particularly resistant to wear in the casting of molten rare earth-iron alloys.

BACKGROUND

One method of making rare earth-iron based magnets is by jet casting molten alloy through a small orifice onto a rapidly moving quench surface. This is disclosed, for example, in U.S. Pat. No. 4,496,395 and U.S. Ser. Nos. 414,936 and 544,728, all to Croat and assigned to General Motors Corporation.

Jet casting results in a rapidly solidified alloy ribbon with a very, very fine-grained microstructure which is commensurate with the creation of permanently magnetic properties in the alloys.

In production jet casting operations, it is desirable to provide a jet casting nozzle which is extremely resistant to wear by the flow of molten rare earth-iron alloys. In jet casting nozzles, the size of the orifice increases as alloy flows through it. Before this invention, nozzles made of sintered and machined boron nitride exhibited the longest lives without excessive orifice wear. However, most nozzles did not last more than a few hours before orifice erosion resulted in underquenched ribbons, i.e., alloy flowed through the nozzle too fast and cooled too slowly to result in optimum permanently magnetic properties. Quartz nozzles have also been used to make rapidly solidified RE-Fe alloys but are much shorter-lived than boron nitride nozzles.

This invention relates to novel ceramic compositions based on mixtures of yttrium oxide and aluminum oxide. Nozzles formed by pressing and sintering very fine powders of these compositions have proven to be exceptionally resistant to erosion by molten rare earth alloys.

BRIEF SUMMARY

In accordance with a preferred embodiment, a mixture of $Y_2O_3$ powder and from about 5 to 30 mole percent $Al_2O_3$ powder is milled to result in an average particle size less than about 10 microns and preferably in the micron to submicron size range. The particles are pressed, preferably by isostatic compaction, to at least about 50% of the theoretical powder density. The compact is sintered to form a closed pore structure comprised predominantly of a very hard $Y_2O_3.Al_2O_3$ monoclinic phase.

DETAILED DESCRIPTION

The invention will be better understood in view of the figures and detailed description which follows.

Figure 1:
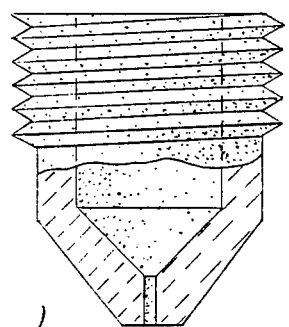

FIG. 1 shows a schematic view of a $Y_2O_3.Al_2O_3$ jet casting nozzle in accordance with this invention.

Figure 2:
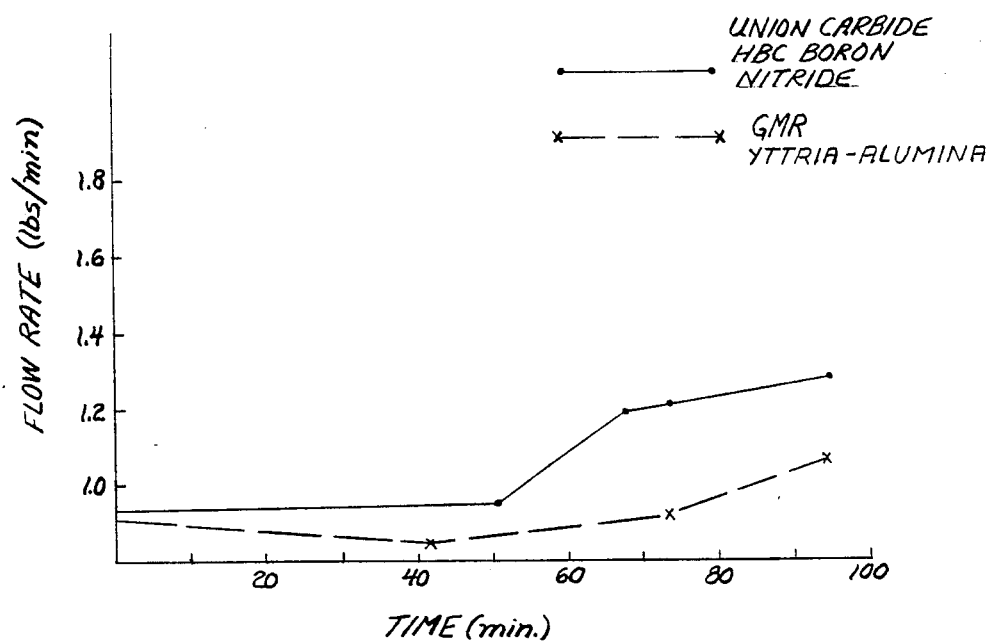

FIG. 2 compares the characteristics of jet caster nozzles made of boron nitride and 80:20 mole percent yttria:alumina ceramic.

EXAMPLE I

Yttrium oxide (also referred to as yttria herein) was formed by mixing yttrium chloride hexahydrate ($YCl_3.6H_2O$, 303 grams) in a liter of water. 516 grams of polyacrylic acid was neutralized with 189 milliliters of concentrated ammonium hydroxide and diluted to 3 liters total volume with water. The yttrium chloride solution was added to the ammonium polyacrylate with rapid mixing. The resultant white precipitate was filtered and washed with water. It was dried at 100° C. and the organic material was burned out at 400° C. The ash was calcined at 1100° C. for one hour until no further weight loss occurred to yield $Y_2O_3$. Precipitation of the yttria in this manner results in a loose agglomeration of fine, relatively uniformly sized particles which is readily ball-milled to form an even finer powder.

241.4 grams of aluminum trichloride hexahydrate was dissolved in one liter of water. 516 grams of polyacrylic acid was neutralized with 126 milliliters of concentrated ammonium hydroxide and diluted to a three-liter volume with water. The aluminum trichloride solution was added to the ammonium polyacrylate solution with rapid mixing and a white precipitate formed. The white precipitate was dried at 100° C. and the organic material burned out at 400° C. The ash was calcined at 1050° C. to yield $Al_2O_3$.

Four moles of yttria (902.2 grams) and one mole of aluminum oxide (102 grams), prepared as set forth above, were mixed together. The mixture was ball-milled in water at room temperature for 30 hours using aluminum oxide balls. The product was dried and put through a 100 mesh screen.

The powder was isostatically pressed into the shape of a jet casting nozzle 2 of the type shown in FIG. 1 in a room temperature vulcanized silicon rubber mold by application of isostatic pressure of 44,000 p.s.i. A 0.030 inch diameter hole 4 was drilled in the green compact. The compact was sintered in air at 1650° C. for about 1.3 hours and achieved greater than 90% theoretical density. The resultant ceramic had closed pores and a hardness of 94.6 on the Rockwell 15-N and 71.8 on the Rockwell C hardness scales. This is commensurate with the formation of a large proportion of an $Al_2O_3.Y_2O_3$ monoclinic phase in the sintered ceramic.

The nozzle was secured to the bottom of a conical yttria tundish with a threaded boron nitride sleeve. An alloy composition comprised, on an atomic percent basis, of about 12.3 percent neodymium, 7.1 percent boron and the balance iron was melted in the tundish. The alloy in the tundish was maintained in a molten state and the nozzle was heated to a temperature of about 1350° C. by a surrounding heating coil.

FIG. 2 shows the normalized rate of flow of the alloy as a function of time through the yttria-aluminum nozzle and a like HBC grade boron nitride nozzle operated under like conditions. The original orifice diameter was about 0.028 inches. (The hole shrinks with respect to that drilled into the green compact during firing.) Flow rate increases through a nozzle as the orifice is worn by the passage of metal through it.

It is apparent from FIG. 2 that the yttria-aluminum oxide nozzle is much more wear resistant than boron nitride. We believe that this is true, at least in part, because the boron nitride experiences both chemical and mechanical erosion in the presence of molten rare earth-iron alloys. The subject $Y_2O_3.Al_2O_3$ ceramic materials are subject only to mechanical wear. However, pure yttria and yttria ceramics containing less than about 5 atomic percent alumina showed no better wear properties than boron nitride—even though they are not subject to chemical attack. $Y_2O_3.Al_2O_3$ ceramics containing more than about 30 atomic percent aluminum oxide are more porous than those containing less $Al_2O_3$ and orifices in nozzles made from such compositions tended to plug in the presence of molten rare earth metals. The average life of jet casting nozzles with 20 atomic percent alumina and the balance yttria is well over 8 hours or one complete manufacturing shift. In fact, the first two $Y_2O_3:Al_2O_3$ 80:20 nozzles evaluated in production lasted for 7.75 and 10 hours respectively, and then the jet casting operation was shut down for purposes other than orifice erosion. After initial erosion of a subject yttria:alumina nozzle, later erosion is much slower than that of BN nozzles: that is, the flow rate curve of FIG. 2 levels off for yttria:alumina nozzles whereas the erosion rate of boron nitride remains fairly constant.

While the invention has been described in terms of nozzles for jet casting rare earth-iron-boron alloys, the subject $Y_2O_3.Al_2O_3$ ceramics have use in many other high temperature and foundry applications. They could be used, for example, as crucible materials for reducing and alloying radioactive elements. They may also be useful for turbine engine parts or ceramic spark plug or sensor bodies. Accordingly, the invention is to be limited only in accordance with the following claims.

The embodiments of the invention in which an exclusive property or privilege is claimed are defined as follows:

1. An refractory ceramic which consists essentially of at least about 84 weight percent yttrium oxide and from 10 to about 16 weight percent aluminum oxide and is comprised predominantly of a $Y_2O_3.Al_2O_3$ monoclinic phase.

2. An ceramic which is resistant to wear by molten rare earth-iron alloys which consists essentially of at least about 84 weight percent of yttrium oxide and from 10 to 16 weight percent aluminum oxide.

3. A wear-resistant refractory nozzle for casting molten metal comprising a non-porous ceramic consisting essentially of at least about 84 weight percent yttrium oxide and from 10 to about 16 weight percent aluminum oxide which ceramic is comprised predominantly of a $Y_2O_3.Al_2O_3$ monoclinic phase.

4. The ceramic of claim 2 wherein the ceramic is comprised predominantly of a $Y_2O_3.Al_2O_3$ monoclinic phase.

* * * * *